United States Patent [19]

Hawkins

[11] 4,030,905

[45] June 21, 1977

[54] GROOVING GLASS BATCH

[75] Inventor: Charles T. Hawkins, Verona, Pa.

[73] Assignee: PPG Industries, Inc., Pittsburgh, Pa.

[22] Filed: Oct. 30, 1975

[21] Appl. No.: 627,163

[52] U.S. Cl. .................................. 65/135; 65/136; 65/335

[51] Int. Cl.[2] ......................................... C03B 3/00

[58] Field of Search ............ 65/135, 136, 134, 335

[56] References Cited

UNITED STATES PATENTS 1,414,008   4/1922   Brown .................................. 65/134

Primary Examiner—Arthur D. Kellogg

Attorney, Agent, or Firm—E. Kears Pollock

[57] ABSTRACT

In the operation of a regenerative glass melting furnace to which glass batch materials are either continuously or intermittently fed as a layer onto the surface of molten glass in the furnace, a plow blade is periodically forced transversely across the width of the furnace at a location such that transverse grooves or depressions are plowed in the floating layer of glass batch materials. This provides for a floating layer of glass batch which is sufficiently contoured to efficiently receive heat from overhead heaters, such as flames from burners, in order to efficiently melt the batch making molten glass for forming.

10 Claims, 4 Drawing Figures

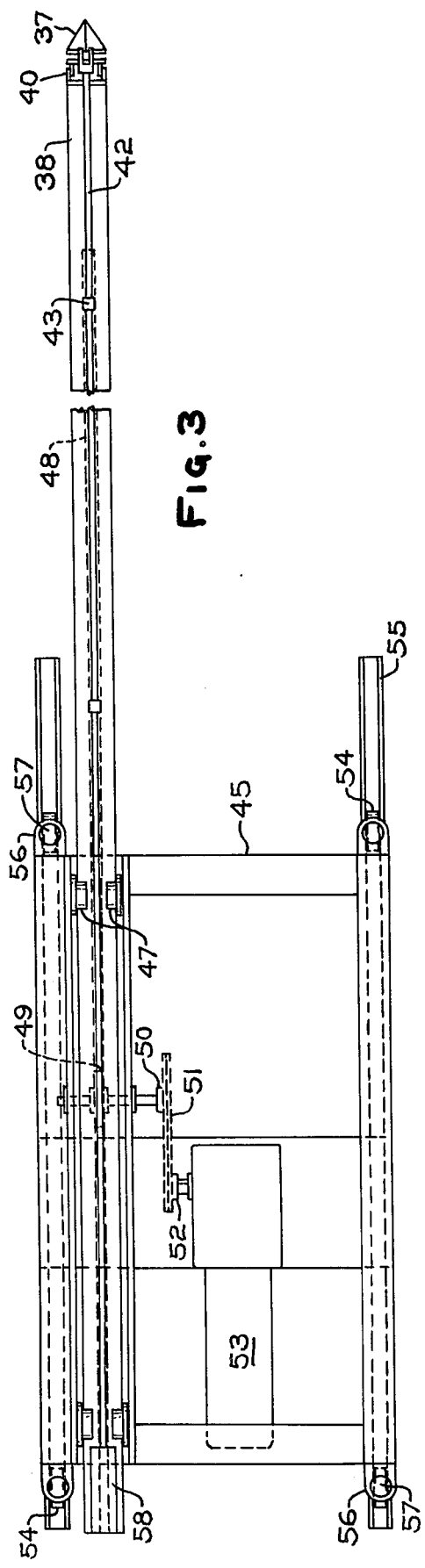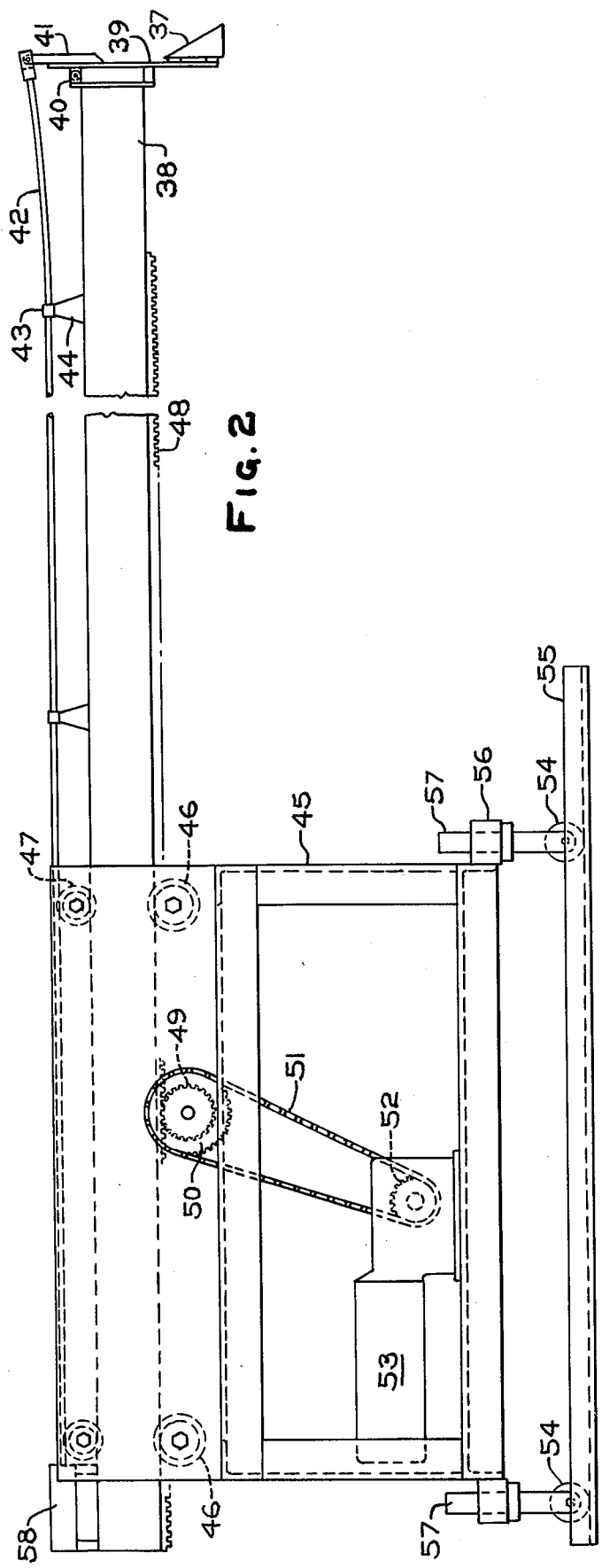

GROOVING GLASS BATCH

BACKGROUND OF THE INVENTION

This invention relates to the melting of glass and, in particular, to the charging and melting of glass batch materials in a regenerative or recuperative furnace that is provided with means for heating the glass batch materials from above in order to melt them for the production of glass in large commercial quantities, particularly for the production of flat glass. The invention relates particularly to the treatment of unmelted glass batch materials that have been charged to the furnace in order to improve melting efficiency of the furnace.

It is well known that glass batch materials used to produce sodalime-silica glass may be melted in large commercial quantities on the order of from 100 to 700 tons per day in regenerative, tank-type furnaces. It has also been known to melt glass batch materials in substantial quantities in recuperative, tank-type furnaces. In the practice of making glass in such furnaces, glass batch materials have long been fed to the furnaces by continuous feeders or by intermittent feeders. Continuous batch feeders, as well as intermittent or periodic batch feeders, are shown and described in many U.S. patents. They may be charged continuously using a blanket feeder of the type described in the following U.S. Pat. Nos. 1,623,057 and 2,624,475 which show devices for feeding a single layer of batch; 2,114,545 and 2,711,837 which show continuous belt devices for feeding two layers — one of cullet and one of batch over the cullet; 2,829,784 which shows a rotating paddle device for feeding two layers — one of cullet and one of batch; and 2,773,611 which shows a device for feeding three layers of batch and cullet.

Alternatively, glass batch materials may be charged using intermittent push feeders such as described in the following U.S. Pat. Nos. 1,483,278; 1,913,665; 1,916,262; 1,917,247; 1,953,221; 2,281,050; 2,284,398; 2,284,420; 2,471,336; 2,556,467; 2,815,135 and 3,193,119 which show devices for feeding continuous transverse logs of batch; 2,831,567 which shows side wall pushers; 2,934,221 which shows a device for feeding divided logs and 509,930; 1,928,016 and 1,941,897 which show devices for feeding two or more streams of batch intermittently to a furnace.

When glass batch materials are fed to a furnace, whether by intermittent feeders or continuous feeders, the glass batch forms as a substantially continuous layer or blanket on top of molten glass near the charging or fill end of the furnace. When intermittent feeders are employed, there is a variation in depth of the layer of batch corresponding to the intermittent nature of feeding. There are peaks corresponding to individual charging or feeding steps and valleys or depressions between the peaks corresponding to the time between successive feeding steps when glass batch materials are not charged.

When the glass batch materials are fed to a furnace continuously, a uniform batch blanket is generally formed on top of the molten glass with the blanket having generally uniform thickness and presenting a relatively flat, upper surface to overhead heating flames. With either method of feeding glass batch, the top surface of batch blanket is flatter than would be desired. Generally, a blanket or layer of batch does not have depressions of sufficient depth into which molten glass can run as the glass batch materials on the surface melt. Such a runnage of molten glass would be useful to continuously expose new unmelted batch materials to overhead flames for melting.

It has long been an objective of glassmakers to provide for more efficient melting of glass batch materials by breaking up the relatively flat, continuous surfaces of batch blankets near the feed ends of glassmaking furnaces. For example, U.S. Pat. No. 3,074,568 illustrates an attempt to provide furrows or the like in glass batch blankets resulting from continuous charging or feeding of glass batch to a glassmaking furnace. In U.S. Pat. No. 2,533,826 there is provided a rabble in the charging end of the glassmaking furnace to periodically move down through a layer of glass batch materials into the molten glass beneath it and to enfold the glass batch materials with molten glass. There have also been a number of schemes in which the glass batch is periodically pressed downward into the glass in order to provide depressions in the upper surface of a floating layer of batch.

The devices which have been employed in the past which press downwardly on a relatively thick layer of glass batch materials immediately after they have been fed or charged to a glassmaking furnace suffer from a common deficiency. The glass batch materials which have been pressed or compacted downwardly at a particular location into the molten glass beneath them rise again upon withdrawal of the compacting or stamping device due to the buoyancy of the glass batch, and the depressions that are so formed are short lived.

The present invention provides an improved apparatus and method for providing depressions in a layer of glass batch materials that have just been charged or fed to a glassmaking furnace.

SUMMARY OF THE INVENTION

A glassmaking furnace, in particular a regenerative or recuperative furnace, having a means for charging glass batch materials into the furnace in the vicinity of a back wall is provided with a blade supported on a transverse arm extending into the furnace in the vicinity of its back wall. The arm extends partially transversely to the longitudinal axis of the furnace. That axis extends from the back wall of the furnace along its length through its melter and refiner to a front wall and defines the general direction of glass batch and molten glass movement through the furnace. Means are provided for moving the blade transversely to the longitudinal axis of the furnace and for locating it during such movement at an elevation for contacting floating glass batch materials. In this way the device is suited for moving the glass batch materials to one or both sides of the blade and to its path of movement transverse to the longitudinal axis of the furnace. This creates a depression in the floating batch materials along the path of movement of the blade. Elevations or mounds of batch are, at the same time, created to one or both sides of the path of movement of the blade. The position of the elevations or mounds corresponds to the direction to which glass batch materials are pushed by the blade.

Since the movement of the blade makes a depression in the floating layer of glass batch materials by applying substantially horizontally directed forces to the glass batch materials rather than by the application of primarily downward forces to the glass batch materials as with stampers, rabbles or the like, the relative depth and the width of the depression which may be produced by use of this blade is not limited by the buoyancy of the glass batch materials with respect to their supporting pool of molten glass in the furnace. Rather, the relative depth and width of a depression, which can be formed by use of this blade, is defined by the flowability of the glass batch materials through which it is moved. Glass batch materials are generally pulverulent and may be powder-like or may be pellets ranging in size upwards to an average pellet diameter of one to two inches. The relative flowability of glass batch materials depends upon many factors including the range of particle sizes of batch materials, the moisture content of the batch materials and the stickiness of the glass batch materials as affected by their temperature and degree of reaction at the location where the blade is employed. In any event, the grooves or depressions which are produced by use of a blade of the kind described here retain their depth and width as glass batch materials continue to move from the location at which each groove or depression is made in the glass batch materials. As the floating glass batch materials advance downstream through the furnace, the batch materials along the grooves or depressions are not subject to a rapid return to a relatively flat, upper surface due to the buoyancy of the glass batch materials.

The blade and its supporting arm are preferably translatably mounted on a support which is external to the glass furnace itself and which includes a drive motor or other device connected to the arm for periodically moving the arm translatably with respect to this external support. In this way both the blade and the arm are moved with respect to the external support and transversely to the longitudinal axis of the furnace.

The external support is preferably a movable carriage which can be completely removed from the vicinity of a glassmaking furnace in order to accomplish maintenance work on either the furnace itself or on the blade and its arm and carriage. The carriage preferably includes telescoping legs or other elevating means for adjusting and maintaining the elevation of the entire assembly, including the blade, in order to provide for a suitable location of the blade with respect to floating glass batch materials within the furnace.

The apparatus also preferably includes, as a means for locating the blade within the furnace, a mount which connects the blade to the arm and permits the blade to be raised or lowered with respect to its supporting arm. A suitable arrangement is a mount which is pivotably mounted on the arm and connected to an actuating assembly which may be employed to pivotably move the mount and the blade connected to it downwardly into a position where it will engage glass batch materials when it is moved across the furnace or move it pivotably upwardly to a position above the floating glass batch materials in the furnace. A suitable actuating assembly is a rod or cable connected to the pivotable blade mount and running along the arm to a piston, cam or the like for moving the rod or cable axially along its length and thereby pivotally moving the blade mount.

Because of the hot, hostile environment of the glassmaking furnace, the arm of the apparatus is preferably hollow so that it may receive a coolant, such as cooling water, during operation. The arm may be constructed of a pair of channel beam members, or pipe or the like which is hollow. Baffles or the like may be provided within the arm in order to enhance the circulation of coolant through it. When the device is provided with a hollow arm for receiving coolant, the arm, of course, is provided with coolant connectors on its end remote from the blade, which end remains outside the furnace during operation. Such connectors are connected to flexible coolant conduits.

During operation, glass batch materials are continuously or intermittently fed to the glass melting furnace as a layer of batch floating on the molten glass and the blade is periodically moved along a substantially horizontal path through the floating glass batch materials in a direction which is substantially transverse of the movement of the glass batch materials through the furnace. Following this, and after an interval of time which permits the glass batch materials containing the depression or groove made by the movement of the blade through the batch to move downstream from the location of the blade, the blade is again moved through the glass batch materials to make another depression or groove in a portion of the layer of glass batch materials which is spaced from that having the first groove. This is continued repeatedly during operation so that spaced grooves extending substantially transverse to the movement of the glass batch materials through the furnace are provided in the batch layer. These grooves provide repositories for molten glass as it is formed by the superficial melting of glass batch materials near the upper surface of the floating layer of batch. As melting continues and as the molten glass flows into the spaced grooves, it will, due to its density and heat, eventually break through the grooves causing a complete breakup of the floating layer of batch into spaced logs which then melt more quickly than a continuous layer of glass batch materials which has not been so treated.

In a preferred practice of this invention, intermediate to each movement of the blade through the glass batch materials, the blade is removed from the glass batch materials by lifting it out of contact with them and is moved back to a starting position and again lowered prior to repeating the movement of the blade through successive portions of the advancing glass batch materials.

While the present apparatus may be employed to improve the melting of glass batch materials which are intermittently fed to a glassmaking furnace, it is found most useful in a glassmaking furnace to which glass batch materials are continuously fed as a blanket-like layer of batch having a substantially flat upper surface. When feeding glass batch materials to a furnace in this manner, it has been found desirable to provide for the movement of such a blade through glass batch materials at a location that is substantially adjacent the charging end of a glass-making furnace. It will be convenient to place the blade and arm inside a fill doghouse or the like substantially immediately following the location for feeding or charging glass batch materials to the furnace.

Because the depressions or grooves made by the present device are less susceptible to refilling due to buoyant effect than depressions made by a stamping apparatus or a rabble, such as shown in the prior art, it is practical to make grooves which are quite deep relative to the thickness of a floating layer of glass batch materials. For this reason, it is particularly desirable to move the blade through the glass batch materials at an elevation such that the glass batch materials are contacted by the blade substantially throughout their depth. This provides for the making of a groove in the glass batch materials extending from the top surface of a layer of batch materials down to the interface between the floating layer of glass batch materials and the underlaying pool of molten glass. When grooves of this depth are made in a layer of molten glass, melt-through occurs quickly and the successive floating logs of glass batch materials begin to efficiently receive heat from overhead flames of a regenerative furnace as the molten glass continuously being formed freely and readily flows off the logs down into the underlaying pool of molten glass.

This invention may be further appreciated by reference to the appended drawings and the description which follows:

BRIEF DESCRIPTION OF THE DRAWINGS

FIG. 2 is an elevation view of the batch grooving apparatus according to this invention;

FIG. 3 is a plan view of the batch grooving apparatus according to this invention.

DESCRIPTION OF THE PREFERRED EMBODIMENTS

Figure 1:
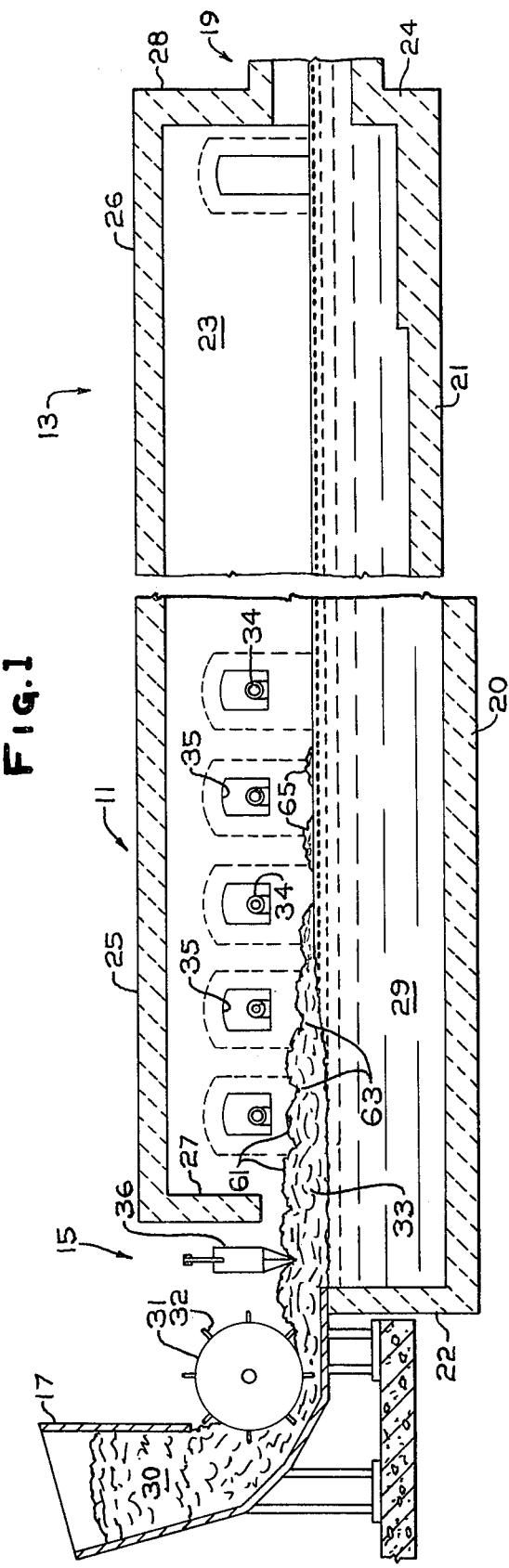
FIG. 1 is a schematic longitudinal sectional elevation of a regenerative glassmaking furnace provided with a continuous batch feeder and a batch groover according to this invention.
Figure 4:
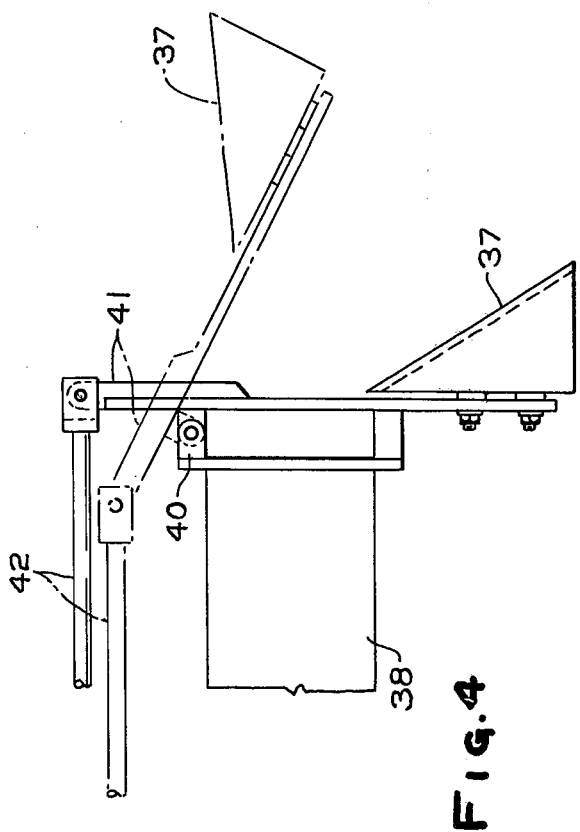
FIG. 4 is a detailed elevation of the blade and arm of the apparatus according to this invention showing how the blade may be moved upwardly out of contact with glass batch materials.

Referring to FIG. 1, the environment and cooperative combination of the elements of this invention may be appreciated. A glassmaking furnace comprises a melter 11, a refiner or conditioner 13 and a fill doghouse or batch charging kiln 15 connected to the melter 11 at its upstream end. A batch hopper 17 or other device for supplying glass batch materials to the furnace is mounted adjacent the upstream end of the melter. A delivery facility 19 is connected to the downstream end of the conditioner 13. The delivery facility 19 may be a forehearth of a bottle or fiber making facility, the drawing kiln of a sheet glass drawing facility, the canal of a float facility or a threshold for delivering molten glass directly onto molten metal for forming.

The main portion of the furnace comprising the melter, conditioner and fill doghouse comprises a melter bottom 20, a refiner bottom 21, which may be at a higher elevation than the melter bottom 20, a back wall 22, which is the lower or basin wall portion of the back wall, side walls 23 showing the breast wall portion of the side walls above the molten glass, a front wall 24 and, overlying the melter, a melter crown 25 and, overlying the refiner, a conditioner crown 26. Extending downwardly from the crowns are a suspended back wall 27 and the upper portion of a front wall 28.

During the production of glass, the bottom portion of a furnace is filled with a pool of molten glass 29. Glass batch materials 30 are provided within the hopper 17 and a feeder, such as a continuous blanket feeder having a cylinder 31 and blades 32, is employed to continuously feed glass batch materials 30 from the hopper 17 into the fill doghouse 15 of the furnace. A continuous blanket-like layer 33 of glass batch materials floats on the pool of molten glass 29 and advances in a generally downstream direction along the longitudinal axis of the furnace (from left-to-right in FIG. 1).

As the layer 33 of batch materials advances downstream from the fill doghouse 15 through the melter 11, it passes beneath burners 34 located in firing ports 35. Flames of natural gas, oil, powdered coal, or a like fuel, are directed over the glass batch materials to heat and melt them causing the batch materials to react and melt to form molten glass, which becomes part of the pool of molten glass 29. The molten glass then generally flows downstream through the furnace melter 11 and conditioner 13 and is ultimately discharged for forming. Located within the fill doghouse 15 of the furnace is a batch groover 36 according to this invention.

The batch groover 36 comprises a plow blade 37 mounted on a support arm or beam 38. The blade 37 is mounted on the arm or beam 38 by a blade mount 39 which is essentially a lever. The blade mount 39 is pivotably connected to the arm 38 by a pivot mount 40 which acts as a fulcrum for the blade mount 39. The blade mount lever 39 is provided with a reinforcing piece 41 having a pivot point connector at its upper end. A cable or rod 42 (or other elongated device for controlling the blade position) is connected at the pivot point connector to the reinforcing piece 41 of the lever mount 39. The cable or rod 42 runs through sleeves or eyelets 43 which are mounted by posts or brackets 44 onto the support arm 38.

The support arm 38 is supported on a carriage 45 by means of bottom rolls 46 and top rolls 47 by which the support arm 39 is supported as it is moved transversely into the glassmaking furnace.

The support arm 38 is provided with teeth 48 and a toothed wheel or gear 49 is provided in the carriage 45 for driving the support arm 38 along its axis of movement relative to carriage 45. The toothed wheel or gear 49 is fixed to a driven gear 58 which is engaged by a drive chain 59 which is further engaged by a drive gear 52 connected to a drive motor 53. The drive gear 52 may be connected directly to the motor 53 or may be connected through a clutch or transmission in a conventional manner.

The carriage 45 is preferably mounted on wheels 54 which may run along a floor adjacent the glassmaking furnace but which are preferably run in tracks 55 in order to maintain the alignment of the carriage support arm 38 with respect to a desired path of travel transverse to the longitudinal axis of the furnace. The wheels 54 for the carriage 45 are mounted on the carriage by means of elevating mechanisms, each comprising a mounting collar 56 having a post or shaft 57 mounted through the collar 56, with a wheel 54 connected to each post 57. The apparatus is provided with a driven piston 58 or other motor means, such as a motor-driven cam or the like, which is engaged to or connected to the cable or rod 42 in order to move it along its axis a sufficient distance to rotate or pivot the lever 39 with respect to the support arm 38 and thereby lift or lower the blade 37 into a desired position. The piston 58 may be a pneumatic cylinder piston device connected to a controlled pressure source (not shown).

When the blade 37 is lowered into its operating position and is moved across the furnace through a layer of floating glass batch materials 33, it mounds the batch as elevation or peaks 61 to either side of the blade and leaves a groove or depression 63 along the path of the blade itself. As the irregular layer of glass batch materials advances downstream through the melter 11, heat from the burners 34 melts the batch at the surface, and the molten glass flows downwardly from the peaks 61 into the grooves or depressions 63. Eventually, the layer breaks up, primarily along the depressions 63, into separate logs 65. The separate logs 65 then quickly and easily melt completely so that the glass may be refined and conditioned prior to discharge for forming.

Although this invention has been described with particular reference to preferred embodiments, those skilled in the art of glass-making will recognize that variations may be made within the scope of the invention in order to satisfy the particular needs of specific furnaces. For example, a plurality of blades may be used with a furnace, a blade may be positioned at many convenient positions along the length of a furnace or a blade may be oriented at different angles with respect to the longitudinal axis of a furnace.

I claim:

1. In an apparatus for the manufacture of glass comprising a glass melting furnace having a bottom, side walls, a front wall, a back wall and a roof; further having, in the vicinity of said back wall, means for charging glass batch materials into said furnace; further having, in the vicinity of said front wall, means for discharging molten glass from said furnace; and further having overhead means for supplying heat to at least a portion of said furnace for melting glass batch materials forming molten glass therefrom; wherein a portion of said furnace is for moving glass batch materials as a layer of batch floating on molten glass along a longitudinal axis of the furnace in a general direction away from said back wall and toward said front wall while melting said floating glass batch materials; the improvement comprising
   a support arm extending into said furnace at least partially transversely to the longitudinal axis of said furnace;
   a blade mounted on said arm for vertical movement with respect to said support arm from an upper position above said batch materials entering said furnace to a lower position in contact with said batch materials; and
   means for reciprocally moving said support and transversely to the longitudinal axis of said furnace, whereby said blade may be moved through said batch materials when said blade is positioned therein.

2. The apparatus according to claim 1 wherein said means for moving said blade comprises a support means upon which said arm is translatably mounted and a drive means connected to said arm for translatably moving it with respect to said support means.

3. The apparatus according to claim 2 wherein said support means is a movable carriage.

4. The apparatus according to claim 1 wherein said means for locating said blade comprises a blade mount connecting said blade to said arm for providing relative movement between them and an actuating assembly for moving said blade upwardly or downwardly relative to said arm.

5. The apparatus according to claim 4 wherein said blade mount is pivotably mounted on said arm and said actuating assembly comprises an elongated member connected to said blade mount and running along said arm and a controllable piston connected to said elongated member.

6. The apparatus according to claim 1 wherein said arm is at least partially hollow for receiving a coolant.

7. In the making of glass wherein glass batch materials are charged to a glass melting furnace having a bottom, side walls, a front wall, a back wall and a roof and wherein said charged glass batch materials are caused to move away from said back wall toward said front wall between said side walls by floating as a layer on molten glass and wherein heat is supplied from above to said glass batch materials to melt them, forming molten glass, and wherein molten glass is discharged from said furnace in the vicinity of said front wall and formed into useful articles; the improvement comprising
   moving a blade substantially horizontally through the floating glass batch materials along a path substantially transverse to the movement of the glass batch materials through the furnace, and
   repeating said blade moving step after a sufficient time interval to provide for the making of spaced depressions in the floating layer of glass batch materials which depressions are of an initial depth above that which would expose molten glass upon which the glass batch materials float.

8. The method according to claim 7 wherein, intermediate to said blade movement steps, the blade is removed from substantial contact with the floating glass batch materials.

9. The method according to claim 7 wherein the glass batch materials are continuously fed as a blanket-like layer of batch and said blade movement steps are carried out by moving the blade through the floating glass batch materials substantially immediately following their being charged to the furnace.

10. The method according to claim 7 wherein said blade movement is carried out at an elevation such that glass batch materials are contacted by the blade substantially throughout the depth of the layer of glass batch materials such that only a thin layer of batch materials remains at the depth of a depression, which layer readily melts through.

* * * * *